Jan. 20, 1953     H. G. HEINRICH     2,626,117
GOVERNOR FOR AUTOMATIC OPENING CONTROL OF PARACHUTES
Filed July 20, 1950     2 SHEETS—SHEET 1
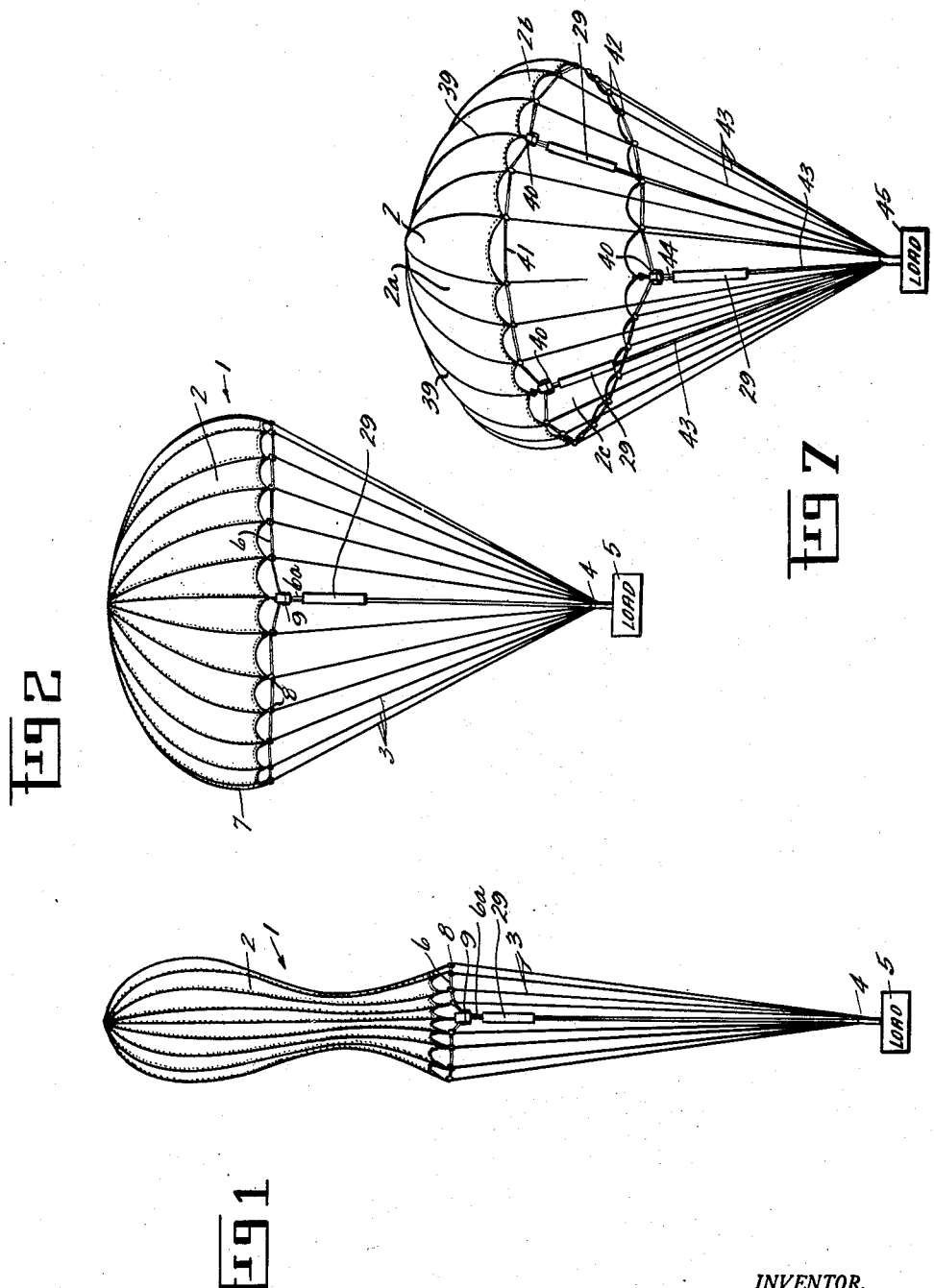
INVENTOR.
HELMUT G. HEINRICH

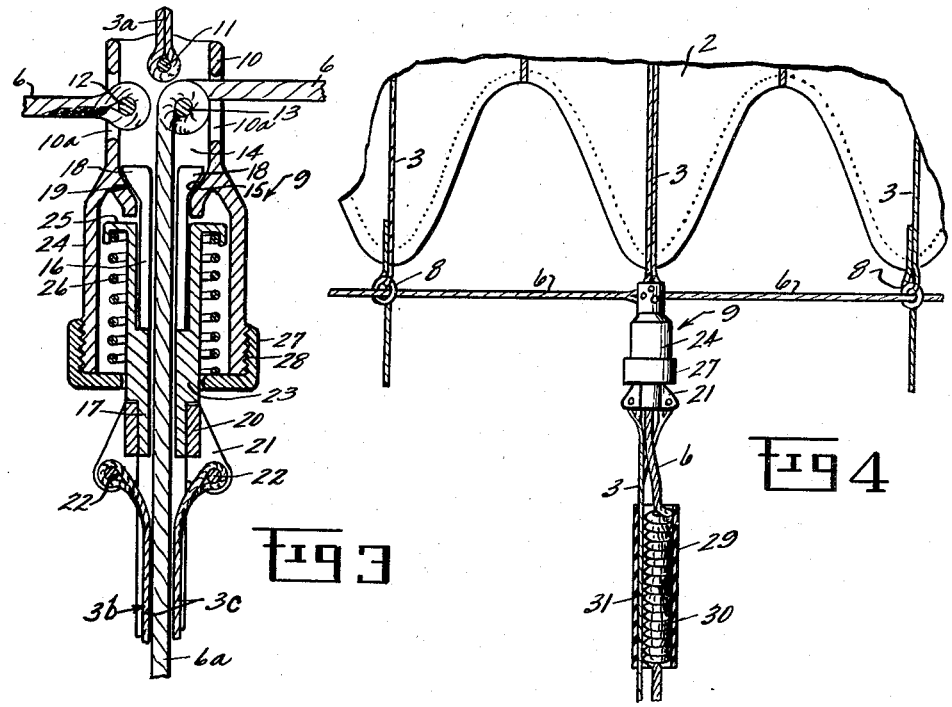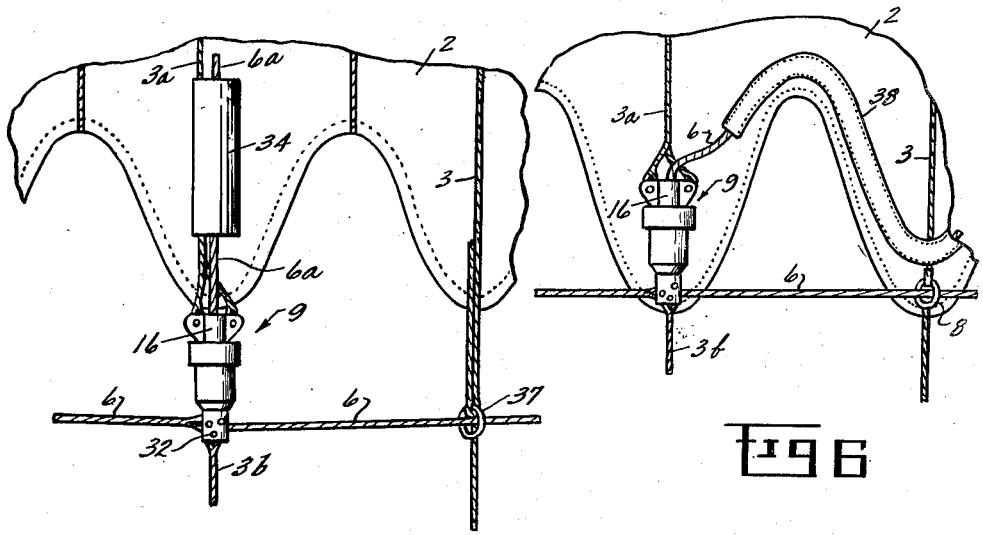

Patented Jan. 20, 1953

2,626,117

UNITED STATES PATENT OFFICE 2,626,117

GOVERNOR FOR AUTOMATIC OPENING CONTROL OF PARACHUTES

Helmut G. Heinrich, Dayton, Ohio

Application July 20, 1950, Serial No. 174,985

12 Claims. (Cl. 244—152)

(Granted under Title 35, U. S. Code (1952), sec. 266)

The invention described herein may be manufactured and used by or for the Government for governmental purposes without payment to me of any royalty thereon.

This invention relates to parachutes, and more particularly to governors for automatic opening control for parachutes, and has for an object the provision of automatic means for regulating the rate and time of opening of parachutes in order to reduce the opening shock and initial loading particularly when the parachutes are released at high speeds. This objective is accomplished by automatically regulating the drag area of the parachute canopy when released by the relative pull of the suspended load in such a manner that the drag of the parachute remains approximately constant as long as the velocity of the chute with the suspended load exceeds a predetermined amount.

The size or area of the opening of the skirt portion or air inlet area is determined and controlled, according to my invention by a reefing means, or reefing cords which extend around the skirt portion or lower edge of the canopy, these reefing cords being controlled by a governor device or governor devices which are in turn controlled by the suspended load and the amount of pull of the load. The governor devices maintain the parachute reefed allowing unreefing movement of the reefing cords when the drag of the canopy is reduced to less than a predetermined value, releasing the reefing lines to free the skirt portion of the canopy, allowing the reefing lines to move and unreef the canopy thus controlling the opening of the canopy or permitting the canopy to expand slowly to its maximum diameter.

Each governor device delays the opening of the canopy when a predetermined relative force or pull of the suspended load is applied or exceeded, but as soon as this load is reduced below a predetermined amount, the governor device permits the canopy to expand until the loading value is again exceeded when the further opening is again stopped or retarded until the ratio of the drag of the canopy to the pull of the suspended load again is reduced below the predetermined ratio.

Another arrangement of my invention includes a plurality of independent reefing lines, each extending around a segmental portion of the canopy skirt for reefing that segment or portion of the canopy and each reefing line having a governor device controlling it and in turn controlled by the suspended load so that if one of the reefing lines or its governor should malfunction or fail it would not cause a complete failure of the whole parachute delayed opening operation. When the amount of pull or drag between the load and the canopy becomes less than a predetermined amount, the governor devices each discontinue its control operation and allows the canopy to open slowly and completely.

In utilizing reefing cords I provide improved retaining means for the purpose of preventing the entangling of the cords while the parachute is being packed and during the opening thereof in the air stream. These retaining means are in the form of elongated flexible or fabric tubular members in which the excess amount of the reefing line is stowed after the canopy is reefed, allowing the reefing lines to be withdrawn without tangling or interference as the canopy is unreefed.

A further object of my invention is the provision of a canopy having a reefing line extending around its skirt portion for controlling the air inlet opening area, together with simple and relatively inexpensive governor control means connected to the suspended load or in the suspension line which is connected to the load and is operated by the relative pull of the suspended load to apply a frictional control or retarding movement of reefing line in a direction to permit unreefing and expansion of the canopy.

A further object is the provision of snubbing means for the reefing line or lines to assist in retarding the movement of the reefing lines in the unreefing direction under the control of the governor devices. Some of the operational principles of the governor device, according to the invention, are the facts that every reefed parachute canopy has a decelerating force of a certain magnitude, depending on its status of inflation or drag area of the reefed canopy, the provision of a governor means for frictionally holding the reefing means against unreefing action, and utilizing the relative ratio of pull at all times to that of the canopy drag to control the operation of the governor device which in turn controls the dereefing action.

Other objects and advantages of the invention will become apparent from the following description when taken in connection with the accompanying drawings in which like reference characters refer to like parts in the several figures thereof.

In the drawings:

Fig. 1 is a somewhat schematic side elevation of a released parachute constructed in accordance with my invention showing the same in reefed condition;

Fig. 2 is a similar view illustrating the parachute in fully extended condition;

Fig. 3 is a vertical sectional view through the center of the governor device shown in Figs. 1 and 2;

Fig. 4 is an enlarged fragmentary plan view of the skirt portion of a parachute constructed in accordance with my invention, illustrating the parachute canopy in reefed or partly reefed condition with the excess portion of reefing cord stowed in a retaining sleeve member attached to one suspension line;

Fig. 5 is a somewhat similar view illustrating a slight modification, in which the excess reefing cord portions are stowed in a sleeve or pocket which is attached to the outer or inner side of the canopy and extends in a radial plane adjacent the upper portion of one suspension line;

Fig. 6 illustrates a further modification in which the excess reefing cord portion is stowed in a sleeve extending part way around the circumference of the canopy; and Fig. 7 illustrates an automatic reefing arrangement incorporating three independent reefing control elements, each disposed to reef a third segment portion of the canopy.

Referring to the drawings, the reference numeral 1 indicates a parachute having a canopy 2 with load suspension or shroud lines 3 connected to the canopy at spaced points around the periphery and converging downwardly to a common securing means 4 to which a load to be suspended is attached as indicated at 5. Reefing means is provided in the form of a reefing line 6 extending around a canopy just below the skirt portion 7, this line extending through guide rings 8 which are secured to the load suspension lines or to the edge of the canopy just below the point of contact of the load suspension lines 3 with the skirt portion. The "live" end of the reefing line 6 extends through a governor device 9, connected intermediate one of the suspension lines 3 as best seen in Fig. 3 of the drawings. In this figure the upper end of the suspension line involved is indicated at 3a while the lower portion of that suspension line is indicated at 3b and may comprise or include a sleeve-like member.

The governor device 9 comprises a body 10 of somewhat cylindrical tubular shape having a cross bar 11 at its upper end (in Fig. 3) to which the lower end of the upper portion 3a of the suspension line is attached. A second cross bar 12 is provided within the hollow portion of the governor device 9 and the "dead" end of the reefing line 6 is secured to this cross bar. When one reefing line is employed the reefing line extends completely around the canopy, through the guide rings 8 secured to the lower edge of the canopy or to the shroud lines 3 and passes over a third cross bar 13 and then downwardly through a central passage that is formed in the body 10. The governor body 10 is formed with a hollow portion 14 which is tapered inwardly and downwardly to provide an annular camming surface 15. A reefing line clamping member 16 is movably disposed within the body for clamping and securing the downwardly extending portion 6a of the reefing line 6. The clamping member 16 has a hollow stem portion 17 through which the downwardly extending portion 6a of the reefing line extends, a plurality of clamping jaws 18 being formed on the upper end of the clamping member 16, said jaws having downwardly and inwardly tapered camming surfaces 19 disposed to engage the camming surface 15 on the body when the clamping member is pulled downwardly, forcing the clamping jaws 18 into frictional holding contact with the downwardly extending "live" portions 6a of the reefing line 6. The lower end of the clamping member 16 is provided with an annular collar 20 fixed thereto having downwardly extending ears 21 and a cross bar 22 therebetween to which the upper end of the lower portion 3b of the load suspension line 3 that is used is secured.

Release means 23 is mounted within the enlarged portion 24 of a governor body 10 and surrounds the straight stem portion of the clamping element 16. The release means 23 includes an annular flange 25 projecting from the clamping member 16 and disposed in engagement with the upper end of a coiled compression spring 26 having a predetermined spring tension. The lower end of this spring 26 is seated in and supported by a cap 27 which is threaded at 28 onto the lower threaded end of the governor body 10.

The compression spring 26 normally tensions the clamping member upwardly to a disengaged or inoperative position relative to the camming surface 15 allowing the resilient clamping fingers or jaws 18 to expand so that the lower end portion 6a of the reefing line 6 is free to move within the clamping member 16. When the suspended load 5 is applied to the lower end portion 3b of the load suspension line 3 having the governor device 9 therein and the pull of the load is resisted by the upper end 3a connected to the parachute canopy 2 and resisted by the canopy "drag." The clamping member 16 is drawn downwardly causing the clamping fingers or jaws 18 to be cammed inwardly into holding engagement with the reefing line 6a and frictionally resist upward or unreefing movement thereof.

The lower end portion 3b of the suspension line containing the governor device therein may be in the form of a sleeve member or have an associated sleeve member 3c for receiving the surplus live end portion of the reefing line 6a when the canopy is reefed, preventing the same from becoming tangled or interlooped with the other lines as the canopy expands. Briefly, the operation of the improved parachute device is as follows: The canopy is initially reefed by drawing in on the downwardly extending live portion 6a of the reefing line 6 to contract or reef the skirt portion somewhat similar to the form shown in Fig. 1 of the drawings. The excess or slack portion of the reefing line 6a is, of course, suitably coiled and carefully stowed in the receiving sleeve 3c of the load suspension lines 3b. The parachute may then be packed in the conventional manner. When released at high velocity the suspended load, resisted by the "drag" of the contracted or reefed canopy, will produce a relatively large amount, but not necessarily excessive or dangerous amount of pull on all of the load suspension lines as the canopy decelerates in the air stream. The load suspension line having the governor element 9 therein permits a relative axial movement between the upper part 3a of the load suspension line which is secured to the canopy and the lower part 3b of that load suspension line which is secured to the load. This relative extension or movement of the portions 3a and 3b draws the clamping element 16 in the governor device downwardly causing the clamping jaws 18 to contract against the downwardly extending portion 6a of the reefing line, resisting further unreefing action of the canopy.

The predetermined tension of the release spring 26 is so proportioned with respect to the ratio of pull of the suspended load relative to the drag of the canopy that the pull on the lower portion of the suspension line portion 3b is sufficient to overcome the release tension or compression of the spring 26, moving the clamping member 16 to maintain the canopy in reefed condition until the pull to drag ratio above is reduced to a predetermined degree whereupon the compression spring tension becomes effective to release the clamping fingers and the canopy is free to expand. Should the canopy expand too rapidly so that the pull-to-drag ratio again increases above the predetermined ratio the load will again pull the suspension line portion 3b downwardly against the release pressure of the spring 26 and engage the camming surfaces of the clamping fingers with the camming surface 15 in the governor device, clamping the reefing line to frictionally prevent further unreefing action and further expansion of the canopy until the same has decelerated further to reduce the pull-to-drag ratio again within safe predetermined limits.

The reefing line 6 upon entering the opening 10a in the upper portion of the body 10 may pass directly around the cross bar 14 and then downwardly through the center of the clamping element 16 into the receiving sleeve member associated with or forming a part of the lower suspension line portion 3b. If, however, it is desirable to increase the "holding" effect on the reefing line 6, the same may be given a wrap around the cross bar 13 before it passes through the clamping element 16.

If desired the sleeve portion for receiving the reefing line slack portion when the canopy is reefed may be a separate sleeve element from the suspension line and secured to the reefing line, or to the canopy portion of the parachute as shown in Figs. 5 and 6. In Fig. 4 the reefing line is indicated at 6 and the suspension line at 3, the stowing guide sleeve for the reefing line is indicated at 29, the stowed-away slack portion of the reefing line being indicated at 30. The sleeve 29 in this figure of the drawing is a separate tubular fabric element and is secured to the suspension line 3 at 31.

In Fig. 5 the governor device 9 is inverted, the lower portion 3b of the load suspension line to which the governor 9 is attached is indicated at 32 while the upper portion 3a of the load suspension line 3 extends downwardly from the top of the canopy, the upper portion 3b being secured to the cross bars 22 on the end part of the clamping element 16.

The sleeve member for receiving the excess or live portion 6a of the reefing line 6, while the canopy is reefed, is carried by the canopy in the structure shown in this figure of the drawing and is indicated at 34. The sleeve lies along the shroud line 3 which includes the governor device 9 and may be secured either to the canopy adjacent that shroud line, or secured directly to the shroud line. Some advantage may be obtained by placing the governor device 9 in the inverted position shown from that illustrated in Figs. 1 to 3. The shroud line receiving sleeve when located on the canopy (either inside or outside) is more widely separated from the loose and depending portions of the shroud lines making the shroud line arrangement less bulky and easier to arrange and fold when the chute is packed; also there is less danger from interference and tangling between the reefing line (or lines) and the suspension lines when they are widely separated in this manner, as the parachute is released and expands. The reefing line as before indicated, extends around the canopy skirt portion through the rings 37 and across a plurality of the suspension lines 3, and is dead ended on the cross bar 12 in the governor device. The excess portion of the reefing line is suitably coiled or folded within the sleeve 34 when the parachute is packed to permit its withdrawal and as the canopy expands with minimum likelihood of tangling or malfunctioning of the parachute.

In Fig. 6 of the drawing the governor device 9 is interposed between the ends of one of the suspension lines 3 as before stated and is located above the lower edge of the canopy in the inverted position with respect to Figs. 1 to 3. The excess or live end portion of the reefing line 6, as shown in this figure, is stowed in a sleeve member 38 which is secured to the canopy just above the lower edge thereof and extends partly around the canopy periphery, parallel to the lower edge.

The governor device shown in Figs. 5 and 6 function 5 similarly to that shown in Figs. 3 and 4 but the reefing line is kept separate from the load suspension lines so that there can be no interference between the reefing line and the load suspension lines other than the gathering and reefing action of the reefing line where it crosses the load suspension lines at the skirt portion.

Referring to Fig. 7 of the drawing the canopy is divided into a plurality of segments, so to speak, each segment having a reefing line and a governor device for reefing that particular segment. Assuming that the canopy is divided into three segments as shown in which each segment is capable of being reefed, indicated at 2a, 2b and 2c, each of the shroud lines 39 which extends downwardly between the segments would be provided with a governor device 40 intermediate its ends. A reefing line 41 is controlled by each governor device, extends laterally through the rings 42 and across the intermediate shroud lines 43 to the governor device below the junction of the next segment. The governor devices 40 are constructed the same as that shown in Fig. 4 and will therefore not be described again in detail. The free ends 43 of the reefing lines pass through the clamping member 16 of the governor devices as shown in Fig. 3 and extend downwardly with their slack ends each disposed in a suitable tubular fabric sleeve member as for instance, shown in Figs. 4 to 6. The upper end of the lower portion of the suspension line, indicated at 44 is connected to the clamping element as in Fig. 3, and its lower end being connected, like the other suspension lines, to the load 45 to be suspended and lowered by the canopy.

When the canopy, shown in Fig. 7 is initially reefed and then released at high velocity each of the governor devices 40 will function independently to maintain their particular segments 2a, 2b and 2c contracted until the parachute has decelerated sufficiently for the release spring 26 to move the clamping element 16 upwardly against the drag or pull of the reefed canopy effective on the body 10 of the governor. In other words, as long as the drag-to-pull ratio between the reefed canopy and the suspended load is excessive and above the predetermined spring pressure of the compression spring 26, the reefing line will be securely held, but when the canopy recelerates such an extent that the drag-to-pull ratio falls below the predetermined value, as determined by the tension of the compression spring 26 this spring is then permitted to move the clamping element 16 upwardly, releasing the reefing line and permitting that segment of the canopy to unreef and expand.

The reefing line, as shown in the drawings, is given a single wrap around the snubbing bar. As the parachute expands considerable frictional engagement of the running reefing line around the snubbing bar may produce sufficient heat to endanger the reefing line. In order to dissipate this heat the snubbing bar may be made of copper or some good heat conducting material, and also provided with a hollow center such as a tubular form, possibly with interior cooling fins.

The reefing line may also be made to encircle the canopy twice, instead of once as shown, and then pass through the governor device to be controlled thereby. This arrangement reduces the force necessary to hold the canopy reefed by a factor of one-half, requiring the predetermined tension of the release spring to be reduced by about one-half. Since the holding tension is materially reduced, the heat generated by the friction of the running reefing line during release and expansion of the canopy will be much less, and can be dissipated more easily. Also it may not be necessary to provide a full snubbing loop around the snubbing bar. Another arrangement contemplated is to utilize a spool or drum with the reefing line wrapped around the drum surface two or three times to prevent slippage, utilizing a brake element for holding the spool, the brake element being operated by the ratio of the pull of the suspended load thereon to the drag of the canopy, and mounted in the governor device; a very slight tension on the reefing line being all that is necessary to keep the reefing line triple snubbed around the spool to prevent any slippage between the spool and the line. When the brake is released the reefing line will rotate the spool as the reefing line is payed out, preventing friction between the reefing line and the holding means.

Having shown and described several simple embodiments and arrangements of my invention, it is understood that my invention is not limited to the exact details of construction disclosed herein, and minor changes and modifications may be made without departing from the spirit of the invention as defined in the accompanying claims.

What I claim is:

1. In a parachute, a canopy having a skirt portion, load suspension means connected to the canopy at spaced points around the periphery, a reefing line extending around the canopy skirt portion for reefing the canopy skirt portion having a dead end, a governor device connected at one end to the skirt portion of the canopy, and also connected to the dead end of the reefing line, friction means within the governor device for receiving the other or live end portion of the reefing line therethrough movable to engage the same, resilient means in the governor device for yieldably maintaining said friction means in nonengaging position, actuating means connected between the friction means and the load suspension means for engaging the friction means with the reefing line to retard movement of the live end of the reefing line incident to predetermined relative pull on the load suspension means.

2. In a parachute, a canopy having a skirt portion, a plurality of load suspension lines connected to the canopy around the skirt portion, reefing line means extending around the canopy adjacent the skirt portion transversely crossing a plurality of the load suspension lines with one end thereof dead ended adjacent one of the load suspension lines and its free end portion extending downwardly, movable friction means, carried by the canopy engaging the downwardly extending free end portion of the reefing lines to resist an upward unreefing movement thereof, spring means engaging said movable friction means to move the same in one direction to a release position relative to the reefing line, and engaging means for the friction means for moving said friction means in the opposite direction to reefing line engaging position to engage the reefing line to resist unreefing movement of the reefing line, said engaging means comprising a load suspension line connected to the friction means for moving the same in opposition to the spring means and extending downwardly with the other load suspension lines for connection to a load to be suspended and lowered by the parachute.

3. In a parachute; a flexible canopy having a skirt portion; load suspension lines extending downwardly from the skirt portion for connection with a load to be lowered by the canopy; a reefing line dead ended adjacent the skirt portion and adjacent one of the load suspension lines and extending transversely across a plurality of the other load suspension lines substantially parallel to the skirt portion having a live end portion extending downwardly; reefing line governor means secured to the canopy adjacent the skirt portion and adjacent the downwardly extending live end portion of the reefing line for receiving the downwardly extending portion of the reefing line; releasable holding means movably mounted within the governor means, movable downwardly to a holding position engaging and securing said reefing line against upward unreefing movement and movable upwardly to a release position, disengaging the reefing line; spring means in said governor means engaging the holding means for yieldably urging said holding means toward release position; and a flexible actuating connection attached to the holding means and extending downwardly for connection with the load to be suspended and lowered by the canopy; whereby when the canopy is initially reefed by downward movement on the downward extending live end portion of the reefing line, and the parachute is released at relatively high velocity, the ratio of the pull of the suspended load on the flexible actuating connection, as resisted by the drag of the canopy, maintains the holding means in holding position until the pull to drag ratio is reduced by deceleration of the parachute, below a predetermined value which is not sufficient to retain the holding means in holding position against said spring means, and said spring means then moves the holding means to release position releasing the reefing line to permit the same to unreef the canopy.

4. In a parachute; a canopy having a skirt portion; a reefing line extending around the skirt portion; reefing line holding means secured to the canopy for receiving the reefing line and securing the same against unreefing movement; resilient actuating means engaging said holding means having a predetermined release pressure for moving the holding means to a release position for releasing the reefing line to permit the unreefing of the canopy skirt portion; and a load suspension line connected at one end to said holding means and operatively connected at its opposite end to the load to be suspended by the parachute for moving the holding means to an operative position against the predetermined resilient pressure of the resilient actuating means upon application of predetermined excessive pull of the load on the load suspension line; whereby when the canopy is initially reefed before release and is released at relatively high velocity, the ratio of the pull of the load on the load suspension line to the drag of the reefed canopy overcomes the predetermined release pressure of the resilient actuating means, and the load suspension line moves the holding means to holding position, and when the ratio of the pull of the load on the load suspension line to the drag of the reefed canopy is reduced by deceleration of the parachute and load to the extent where the predetermined release pressure of the resilient actuating means exceeds the pull of the load on the load suspension line the holding means is moved by the resilient actuating means to release the reefing line and permit unreefing of the canopy skirt portion.

5. Apparatus as claimed in claim 4 in which tubular reefing line retainer means are provided, fixed relative to the parachute for receiving the free live end portion of the reefing line when the canopy is reefed to prevent tangling thereof during packing and unreefing.

6. In an automatically controlled reefed parachute; a flexible canopy having a reefed skirt portion; load suspension lines connected to the canopy at spaced points around the skirt portion; a reefing line extending around the canopy adjacent the skirt portion and across the shroud lines, holding the canopy in reefed condition; reefing line governor means connected at one end to one of the load suspension lines adjacent the skirt portion, said governor means having a guide passage therethrough for receiving the free end portion of the reefing line therethrough; friction clamping and holding means axially movable in the guide passage of the governor means in a downward direction to clamp the reefing line, and in an upward direction to a release position to release the reefing line, spring means in the governor means for moving the clamping means upwardly to release position; and a flexible positive connection between the clamping means and one of the load suspension lines for moving the clamping means downwardly against the tension of the spring means, for engaging the clamping means with the reefing line to resist unreefing movement thereof upon predetermined downward pull on the load suspension line.

7. In a parachute; a canopy having a skirt portion; a reefing line surrounding the canopy skirt portion for holding the skirt portion in reefed condition and releasing the skirt portion; said reefing line having a dead end and a live end portion; a governor device secured to the canopy adjacent the skirt portion having the dead end of the reefing line secured thereto; said governor device having reefing line guide means therein, and an axial bore therethrough for receiving the live end portion of the reefing line and guiding the same therethrough; an axially movable reefing line clamping member disposed in said bore in surrounding relation to the live end portion of the reefing line which extends through the bore; said clamping member having a camming surface thereon; a complemental camming surface formed on the governor device in the path of movement of the clamping member for camming engagement therewith for actuating the clamping member into clamping engagement with the live end portion aforesaid of the reefing line; spring means in said governor device engaging the clamping member have a predetermined tension for moving the clamping member to a release position to release said reefing line live end portion, an actuating connection on the clamping member for positively moving the clamping member to shift the camming surface thereon into camming engagement with the camming surface of the governor device to clamp and secure the reefing line live end portion against unreefing movement, said actuating connection being adapted for connection to the load to be suspended and lowered by the canopy; whereby a predetermined application of load, applied to the actuating connection as resisted by the drag of the reefed canopy, actuates the clamping member to maintain the canopy reefed, and a predetermined reduction in the ratio of the pull of the suspended load to the effective drag of the reefed canopy permits the spring means to move the clamping member to free the live end portion of the reefing line and allow the canopy to expand.

8. In a parachute; a canopy having a skirt portion; contractable reefing means surrounding the skirt portion for reefing of the skirt portion to initially limit the maximum drag to pull of the suspended load ratio of the parachute when released while traveling at an excessive velocity; releasable securing means connected to the canopy and engaging the contractable reefing means to secure the contractable reefing means against unreefing movement; spring means engaging said releasable securing means having a predetermined tension for yieldably holding the releasable securing means in release position; and positive actuating means connected to the releasable securing means for positively moving the releasable securing means to operative holding engagement with said contractable reefing means, against the predetermined tension of the spring means to prevent unreefing action of the contractable reefing means; and an actuating connection between the actuating means and the load suspension means; whereby the ratio of the pull of the suspended load on the load suspension means as resisted by a predetermined drag of the canopy when excessive, moves the release means into holding engagement with the contractable reefing means, to prevent unreefing action of the reefing means, and a predetermined reduction in the ratio of the drag of the canopy to pull of the suspended load allows the predetermined tension of the spring means to move the release means to release position, releasing the contractable reefing means and allowing the canopy to expand.

9. In a parachute; a canopy having a skirt portion; load suspension lines extending downward from the skirt portion at substantially equally spaced points around the skirt portion; a yieldable extensible governor device interposed in at least one of the load suspension lines having a body adjacent the skirt portion; a reefing line extending at least partly around the canopy adjacent the skirt portion having one end secured relative to the canopy skirt portion and a live end portion extending through the body of the governor device to be controlled thereby; reefing line clamping means axially movable within the body of the governor device having a contractable guide passage for the live end portion of the reefing line to pass therethrough; contracting means operable between the body and the clamping means incident to movement of the clamping means in one direction for contracting the clamping means on the reefing line to secure the reefing line against unreefing movement; spring means interposed between the body and the clamping means for yieldably tensioning the clamping means in the opposite direction to move the same to release the reefing line and allow the canopy to expand; whereby the ratio of pull on a suspension line having the governor means therein, to the drag of the canopy adjacent that suspension line determines the movement of the clamping means between clamping and release positions.

10. In a parachute, a canopy; load suspension lines secured to the canopy and extending downwardly from above the skirt portion through equally spaced points around the skirt portion, adapted to be connected to a load to be suspended by the canopy; a plurality of extensible governor devices, each interposed in an intermediate load suspension line with a plurality of other load suspension lines between the same and the next load suspension line having a governor device therein; a reefing line dead ended adjacent each governor device and extending across a segmental portion of the canopy and the intervening suspension lines to the next governor device, to be controlled thereby for selectively reefing and controlling the expansion of that segmental portion of the canopy; said governor devices each comprising a hollow elongated tubular body, movable reefing line engaging and clamping means therein having the live end portion of the reefing line extending through the body for holding engagement by the clamping means; release spring means between the body and the clamping means having a predetermined release tension urging the clamping means to a release position for releasing the live end portion of the reefing line; said body and the clamping member being connected to the load suspension line at spaced points therein, intermediate the ends of the load suspension line; whereby relative pull on the opposite ends of the load suspension line caused by the ratio of the drag of the canopy relative to the pull of the suspended load on the opposite ends of the load suspension line moves to clamping means to reefing line clamping and holding position when the drag-to-pull ratio is relatively greater than the predetermined relative tension of the release spring means, and the release spring means moves the clamping means to release position when the ratio of the relative drag of the canopy to the relative pull of the suspended load effective on that load suspension line becomes less than the effective predetermined spring tension of the spring means, freeing that reefing line to permit that segment of the canopy to unreef and expand.

11. Apparatus as claimed in claim 10; including reefing line retaining guide sleeve means secured to the parachute, having a line receiving end disposed adjacent each governor device for initially receiving the excess portions of the live ends of the reefing lines from the governor devices when the segmental portions of the canopy are reefed, and feeding the reefing lines to the governor devices as the canopy unreefs and expands.

12. In a parachute, a canopy having a skirt portion, load suspension lines connected to the canopy at the skirt portion, a reefing line extending around the canopy adjacent the skirt portion, an extensible governor device connected at its upper end to the canopy skirt portion and at its lower end to one of the suspension lines for receiving the reefing line therethrough and securing the reefing line against unreefing movement when the governor means is extended, resilient means in the extensible governor device normally holding the same in nonextended position, said extensible governor device being extensible by a predetermined excessive pull on that load suspension line to secure the reefing line and retractable by the resilient means upon predetermined reduction in pull on that load suspension line to free the reefing line and allow the canopy to expand.

HELMUT G. HEINRICH.

REFERENCES CITED

The following references are of record in the file of this patent:

UNITED STATES PATENTS

| Number | Name | Date |
|---|---|---|
| 2,066,094 | Crawford | Dec. 29, 1936 |
| 2,384,127 | Nailor | Sept. 4, 1945 |

FOREIGN PATENTS

| Number | Country | Date |
|---|---|---|
| 128,699 | Great Britain | July 3, 1919 |
| 121,615 | Switzerland | July 16, 1927 |
| 709,240 | Germany | Aug. 11, 1941 |